United States Patent [19]

Hermann et al.

[11] Patent Number: 5,204,621
[45] Date of Patent: Apr. 20, 1993

[54] POSITION SENSOR EMPLOYING A SOFT MAGNETIC CORE

[75] Inventors: Michael Hermann, Schwenningen; Johann von der Heide, Schramberg; Hans-Dieter Papst, St. Georgen; Uwe Mueller, Eisenbach, all of Fed. Rep. of Germany

[73] Assignee: Papst-Motoren GmbH & Co. KG, St. Georgen, Fed. Rep. of Germany

[21] Appl. No.: 651,450

[22] Filed: Feb. 7, 1991

[30] Foreign Application Priority Data

Feb. 8, 1990 [DE] Fed. Rep. of Germany ....... 4003813
Apr. 21, 1990 [DE] Fed. Rep. of Germany ... 9004531[U]

[51] Int. Cl.$^5$ .............................................. G01B 7/14
[52] U.S. Cl. ........................... 324/207.18; 324/207.22
[58] Field of Search .............. 324/207.11, 207.12, 324/207.16, 207.17, 207.18, 207.19, 207.22, 207.23, 207.24, 207.25, 207.26, 234, 236, 239, 253, 255, 259, 260–262; 340/870.31, 870.33, 870.35, 870.36; 336/45, 30, 110, 170, 198, 200, 210, 221, 232–234

[56] References Cited

U.S. PATENT DOCUMENTS

| | | | |
|---|---|---|---|
| 3,641,429 | 2/1972 | Cox, Jr. et al. | 324/207.19 |
| 4,639,667 | 1/1987 | Andresen | 324/207.18 |
| 4,678,991 | 7/1987 | Schmidt | 324/207.18 |
| 4,697,144 | 9/1987 | Howbrook | 324/207.17 |
| 4,774,465 | 9/1988 | Nilius | 324/207.18 |

FOREIGN PATENT DOCUMENTS

| | | |
|---|---|---|
| 0238922B1 | 9/1987 | European Pat. Off. . |
| 3933627A1 | 9/1990 | Fed. Rep. of Germany . |
| 3914787A1 | 11/1990 | Fed. Rep. of Germany . |

Primary Examiner—Gerard R. Strecker
Assistant Examiner—Warren S. Edmonds
Attorney, Agent, or Firm—Finnegan, Henderson, Farabow, Garrett & Dunner

[57] ABSTRACT

A position sensor using a soft magnetic core and a permanent magnet for detecting linear or rotary movements of a part. In one embodiment, a differential transformer is provided with corresponding windings 3, 4 and 5, which are wound on a tubular carrier member 2. Provided inside the carrier member 2 are a saturatable core 6 with a V-shaped crosssection section and a control magnet 8 which slides on the inner surfaces. The core 6 is partially saturated on the contact surfaces, so that a virtual air gap is produced, so that the transformation ratio between the windings 3 and 4, 5 is controlled as a function of position. Other versions employ flat and/or meandering coil arrangements and, in two instances, rotational relative motion.

19 Claims, 7 Drawing Sheets

POSITION SENSOR EMPLOYING A SOFT MAGNETIC CORE

The invention relates to a position sensor for detecting linear or rotary movements of a part, having an elongate measuring coil arrangement in which a soft magnetic core is arranged in a stationary fashion in the longitudinal direction and which core has a cross-section that is small in relation to the longitudinal extent, having a control magnet, in particular a permanent magnet, which can be moved by the part and can be moved in the longitudinal direction of the soft magnetic core, partially saturates the latter magnetically as a function of position, and thus controls the electrical values of the measuring coil arrangement, and having an evaluation device for evaluating the electrical values of the measuring coil arrangement, which vary as a function of position.

There is already known from EP-B 238 922 a magnetic position sensor for detecting the position of an item under test, which consists of a differential transformer having a stationary core of soft magnetic material. Moved along this core together with the item under test is a permanent magnet which partially saturates the soft magnetic core magnetically as a function of position, so that at this point in the core a virtual air gap is caused which has a corresponding influence on the coupling between the windings of the differential transformer. A similar magnetic position sensor is also known from German Offenlegungsschrift 3,914,787.

Although in the magnetic position sensor according to EP-B-238 922 the soft magnetic core is situated inside the measuring coil arrangement with primary and secondary windings, the control magnet is provided outside the entire arrangement, so that external magnetic fields can cause relatively large measuring errors. Moreover, such a position sensor has a relatively complicated construction and requires costly guide means for the precise guidance of the control magnet with respect to the soft magnetic core.

It is the object of the invention to minimize the influence of external magnetic fields and in so doing to arrive simultaneously at low production costs.

This object is achieved in accordance with the present invention when the soft magnetic core is constructed to have a trough-shaped, in particular V-shaped or U-shaped, cross-section, and the control magnet is arranged between the legs of the core inside the measuring coil arrangement and can be moved by the part. This solution has the advantage that the air gap between the control magnet and the core can be kept small and always has the same size, in order to permit measurement with high reliability. Insensitivity with respect to external fields is substantially enhanced by contrast with the position sensor according to the prior art discussed.

The measuring coil arrangement of the position sensor according to the invention is preferably wound on a tubular carrier member, and the length of the core corresponds approximately to the length of the measuring coil arrangement and the length of the travel of the control magnet. The core is preferably produced from soft iron sheet material.

In a position sensor of the type mentioned at the beginning, a further solution for achieving the object set consists in the fact that the measuring coil arrangement is constructed as an elongate flat coil arrangement and the soft magnetic core is constructed as an elongate foil, which are situated in layers one above the other. The measuring coil arrangement is preferably constructed as a printed circuit, or the measuring coil arrangement and the soft magnetic core are laminated onto an insulating carrier. This mode of construction results in a particularly low outlay on production, since such measuring coil arrangements can be produced in a simple way by machine, i.e. expensive winding of coils is avoided. Since the control magnet is guided at a very small distance past the soft magnetic core in the form of a foil corresponding to the moving part, the result is a high sensitivity of the position sensor, which simultaneously is scarcely influenced by external fields.

In a particularly advantageous embodiment, the control magnet is suspended elastically with the part in a laterally deflecting manner, is attracted by the core, touches the latter and is simultaneously guided by the latter. As a result, special guide means are saved. The control magnet and/or the core are preferably coated on the contact surfaces with a abrasion-resistant and friction-reducing layer, so that despite this contact a long service life and low operating forces are attained.

The position sensor can be constructed equally for linear, rotary or other movements of a part. In such a case, the measuring coil arrangement and the core are matched to the travel of the part and of the control magnet, and constructed either linearly or arcuately.

The windings of the measuring coil arrangement can be constructed not only helically, but also in a meandering fashion. A particularly fine resolution of the position sensor can be achieved in this way.

The measuring coil arrangement is preferably constructed as a transformer having a plurality of windings, in particular in the form of a differential transformer. In the case of meandering windings, the latter can also be arranged nested in a meandering fashion.

A particularly advantageous embodiment of a position sensor for rotary movements is characterized in that the transformer comprises a plurality of flat coils arranged in the form of sectors, and a soft magnetic core in the form of a foil having a circular surface, which are arranged above one another on a carrier plate, and in that the control magnet is radially magnetized and controls the soft magnetic core with its end face in order to detect a rotary movement of the part.

Various forms of evaluation devices can be provided. In an advantageous embodiment, the evaluation device is constructed to measure inductance-dependent current characteristics of the measuring coil arrangement. Here, pulsed currents are preferably fed to the measuring coil arrangement. Another embodiment is characterized in that the evaluation circuit evaluates the transfer of alternating-current signals or pulse signals from the primary winding to the secondary winding of the measuring coil arrangement, as a function of the position of the control magnet.

Further details of the invention emerge from the following description of exemplary embodiments with reference to the enclosed drawings, wherein.

Figure 1:
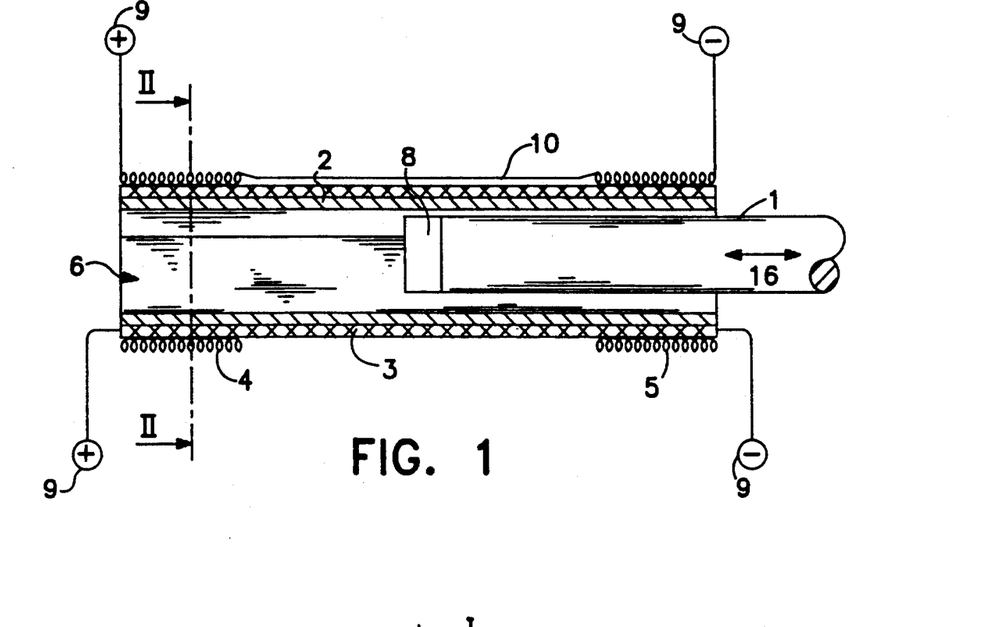
FIG. 1 shows a longitudinal section through a first embodiment of a position sensor along the line I—I of FIG. 2.
Figure 2:
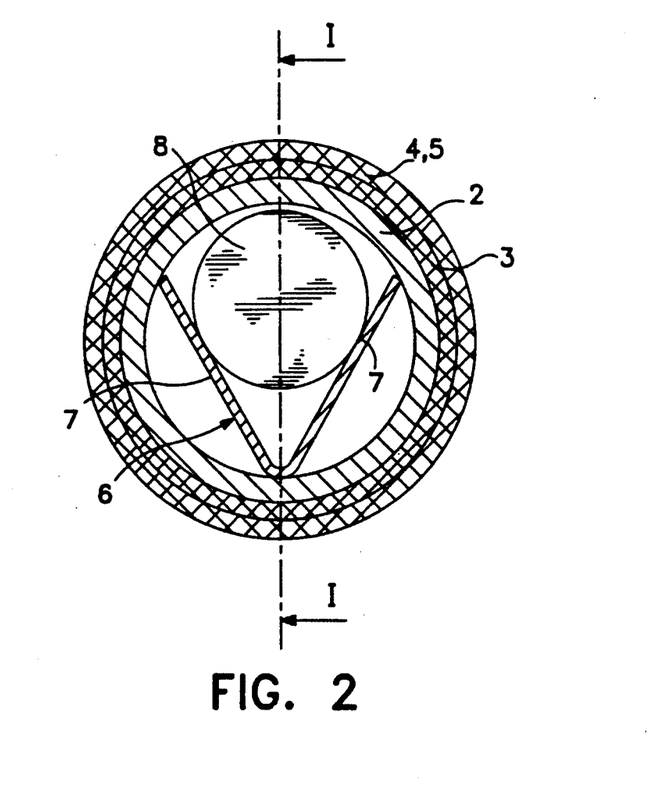
FIG. 2 shows a section through the position sensor according to FIG. 1, in an enlarged representation along the line II—II in FIG. 1.

The position sensor represented in FIGS. 1 and 2 comprises a tubular carrier member 2, on which a secondary coil 3 is wound over the essential part of its length. Arranged on the axial end regions of the carrier member 2 are two coil sections 4 and 5, which are connected to one another by a jumper 10 and form the primary coil. The corresponding coils 3, 4 and 5 are provided with terminals 9.

Arranged inside the measuring coil arrangement consisting of the coils 3, 4 and 5, that is to say in the present example inside the carrier member 2, are a trough-shaped core 6 and the control magnet 8 arranged on a moving part 1, the control magnet 8 having in the present example a circular cross-section and bearing with its circumferential surface against the inner surfaces of the legs 7 of the trough-shaped core 6. In the present example, the trough-shaped core 6 has a V-shaped construction. Other shapes, such as, for example, a U-shape, are also possible depending upon the spatial relationships and the shape of the control magnet 8.

The movable part 1 can be moved in the direction of the double arrow 16 in the direction of the longitudinal axis of the measuring coil arrangement, to be precise in such a way that the control magnet 8 essentially sweeps the entire length of the core 6. The core preferably consists of soft iron sheet material, and is saturated magnetically at the point at which the control magnet 8 is currently situated. This partial saturation leads to a virtual air gap in the core 6, as a result of which the coupling relationships between the primary coils 4 and 5 and the secondary coil 3 are varied as a function of position. The movable part 1 with its control magnet 8 is mounted resiliently in the transverse direction, so that during attraction of the inner surfaces of the legs 7 of the core 6 the control magnet 8 remains in close contact with the latter, as a result of which particularly stable magnetic relationships are produced. In order to reduce the frictional forces between the control magnet 8 and the inner surfaces of the core 6, and to reduce wear, the contact surfaces of the two parts are expediently coated with an abrasion-resistant and friction-reducing layer (not shown).

Figure 3:
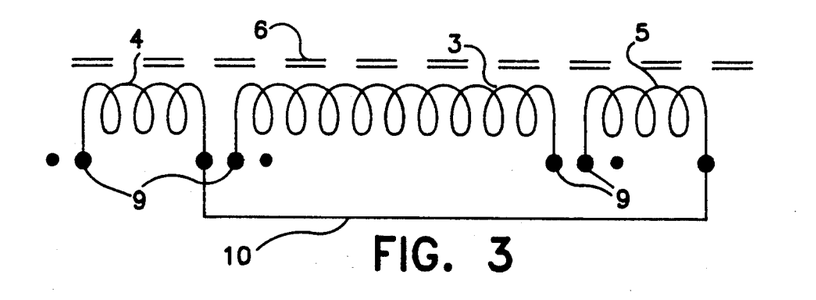
FIG. 3 shows an electrical circuit diagram to explain the polarities of the measuring coil arrangement of the position sensor according to FIGS. 1 and 2.

The windings 3, 4 and 5 of the measuring coil arrangement of the first exemplary embodiment are connected as differential transformer, and this is shown in detail by the circuit diagram according to FIG. 3. It is evident that in the case of the polarities indicated by points on the individual windings 4, 3 and 5 opposite polarities are produced for the primary part-windings 4 and 5.

Figure 4:
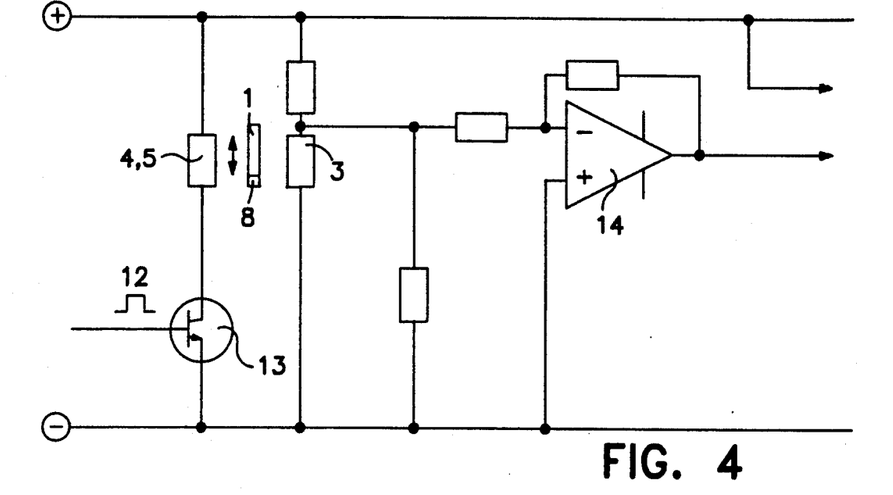
FIG. 4 shows a circuit diagram of an evaluation device.
Figure 5:
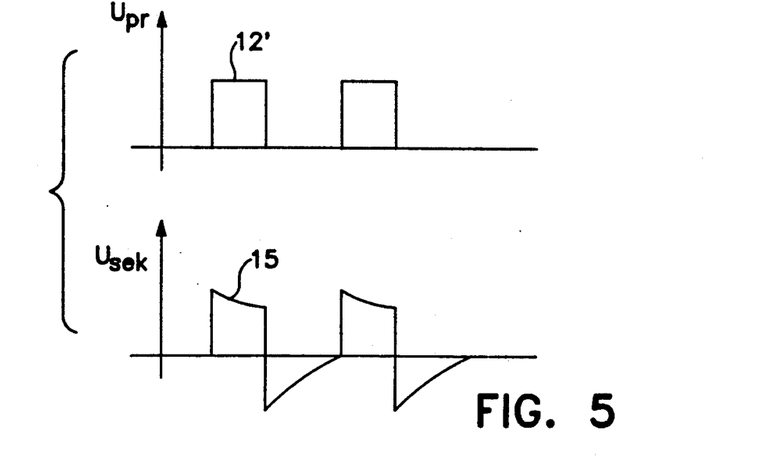
FIG. 5 shows a voltage-time diagram relating to the evaluation device according to FIG. 4.

FIG. 4 shows an example of an evaluation device for the position sensor according to FIGS. 1 to 3. A transistor 13 controlled by a control pulse 12 pulses the primary winding consisting of the part-windings 4 and 5. Depending upon the position of the control magnet 8 connected to the moving part, a position-dependent signal is transmitted to the secondary winding 3 and evaluated by a differential amplifier 14. As FIG. 5 shows, the primary voltage $U_{pr}$ is in the form of pulses 12', and the signal $U_{sek}$ transmitted to the secondary winding 3 has the form of a deformed square-wave pulse 15. A conclusion can be drawn on the position of the control magnet 8 with respect to the core 6 from the pulse characteristic of the pulses 15. However, it is also conceivable to feed a sinusoidal alternating-current signal to the primary winding 4, 5, and to evaluate the amplitude of the voltage induced in the secondary winding 3. Moreover, it is possible to interchange the windings 4, 5 and 3 in function with one another, i.e. to use the winding 3 as the primary winding and to use the two interconnected part-windings 4 and 5 as a secondary winding. Finally, it is also possible to provide only one winding and to evaluate its inductance as a measure of the position of the control core 8.

Figure 6:
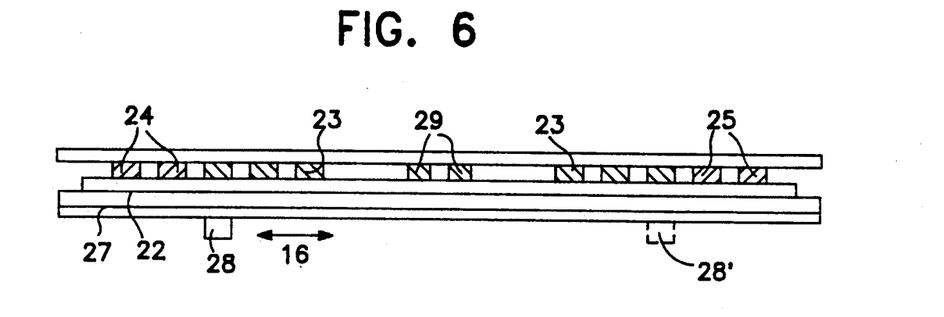
FIG. 6 shows a longitudinal section of a second embodiment of a position sensor in accordance with the line VI—VI of FIG. 7.
Figure 7:
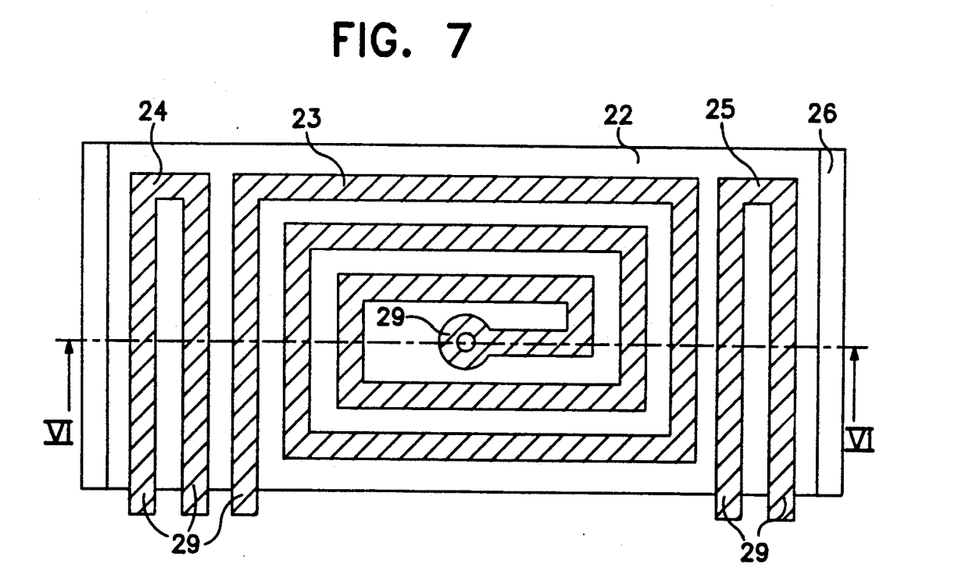
FIG. 7 shows a plan view of the position sensor according to FIG. 6.

Represented in FIGS. 6 and 7 is a second embodiment of the position sensor according to the invention. Here, the coils 23, 24, 25 of the measuring coil arrangement are not wound on a tubular carrier member as in the first exemplary embodiment, but are arranged as flat coils in the form of a printed circuit on a carrier substrate 22. Here, too, a secondary coil 23 is provided, together with a primary coil consisting of two coil sections 24 and 25. The two types of coil can be interchanged with one another. The flat windings 23, 24, 25 are arranged on one side of the substrate 22, while the core material 26 is laminated onto the opposite side in the form of a foil. Moreover, the windings 23, 24, 25 are covered by an insulating layer. The control magnet 28 can be displaced in the longitudinal direction in the direction of the double arrow 16 in the range of the dimensions of the inner winding, the secondary winding 23, to be precise from the position 28 represented by solid lines into the position 28' represented by dashed lines. In the case of this exemplary embodiment, as well, the control magnet 28 attracts the core 26, so that a good contact is produced between the two parts. A protective layer 27 is provided between the two parts and is laminated onto the core layer in order to prevent friction and wear. The windings 23, 24 and 25 are provided with terminals 29.

Figure 8:
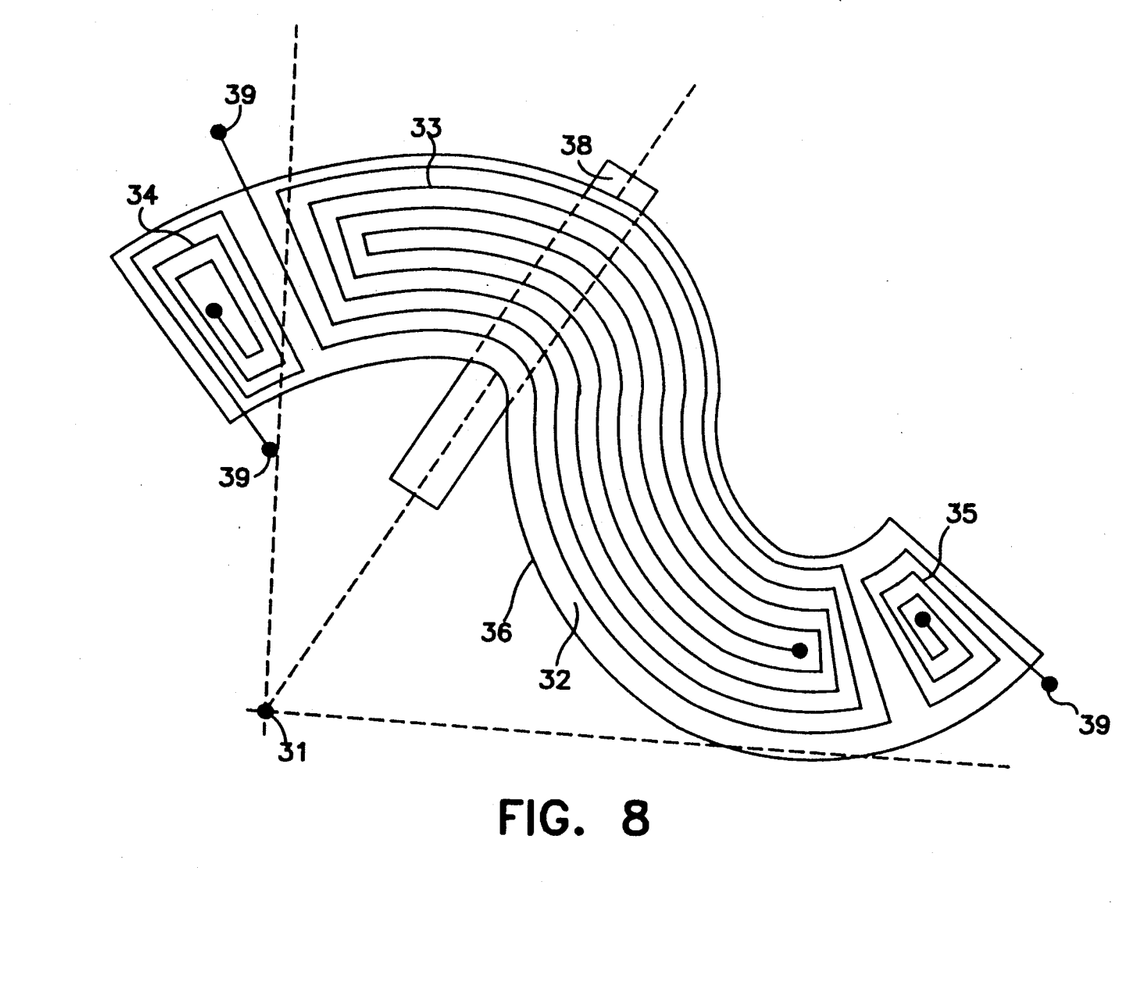
FIG. 8 shows a third embodiment of a position sensor in plan view.

The position sensor according to FIGS. 6 and 7 can be used not only to determine the position of a linearly movable part 1, but—given appropriate construction—also for arcuate or other forms of movement. FIG. 8 shows such an example, in which the corresponding measuring coils 33, 34 and 35 are arranged as flat coils on a substrate of arbitrary shape. A control magnet 38 is arranged opposite a core 36 (below the substrate 32) capable of moving in an arcuate fashion about a center of rotation 31, and sweeps the entire surface of the measuring coil arrangement 33, 34, 35. The corresponding measuring coils are connected via terminals 39 to an evaluation device (not shown).

Figure 9:
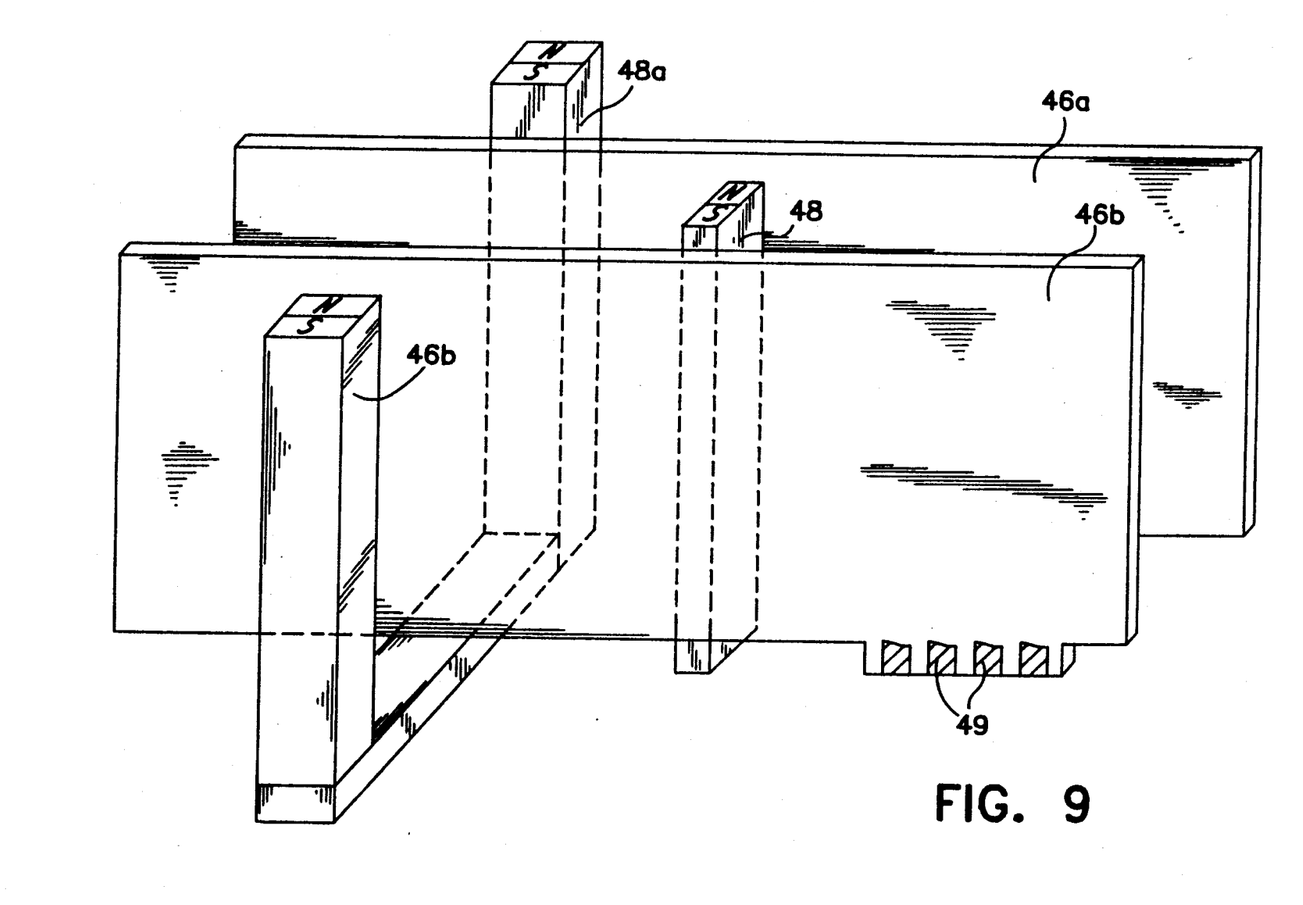
FIG. 9 shows a perspective representation of a fourth embodiment of a position sensor.

FIG. 9 shows a further embodiment, in which either two measuring coil arrangements having corresponding cores 46a and 46b are controlled as a function of position by a common control magnet 48, or the two measuring coil arrangements 46a and 46b are influenced by two separate control magnets 48a and 48b, which are opposite one another but are magnetized with mutually opposite polarity. The two control magnets 48a and 48b are moved uniformly by a movable part (not shown) in the longitudinal direction of the measuring coil arrangements. The terminals of the individual windings of the measuring coil arrangements are brought out via plug-in contacts 49. The arrangement of two control magnets 48a and 48b of opposite polarity has the advantage that external stray fields have an even smaller influence on the measurement.

Figure 10:
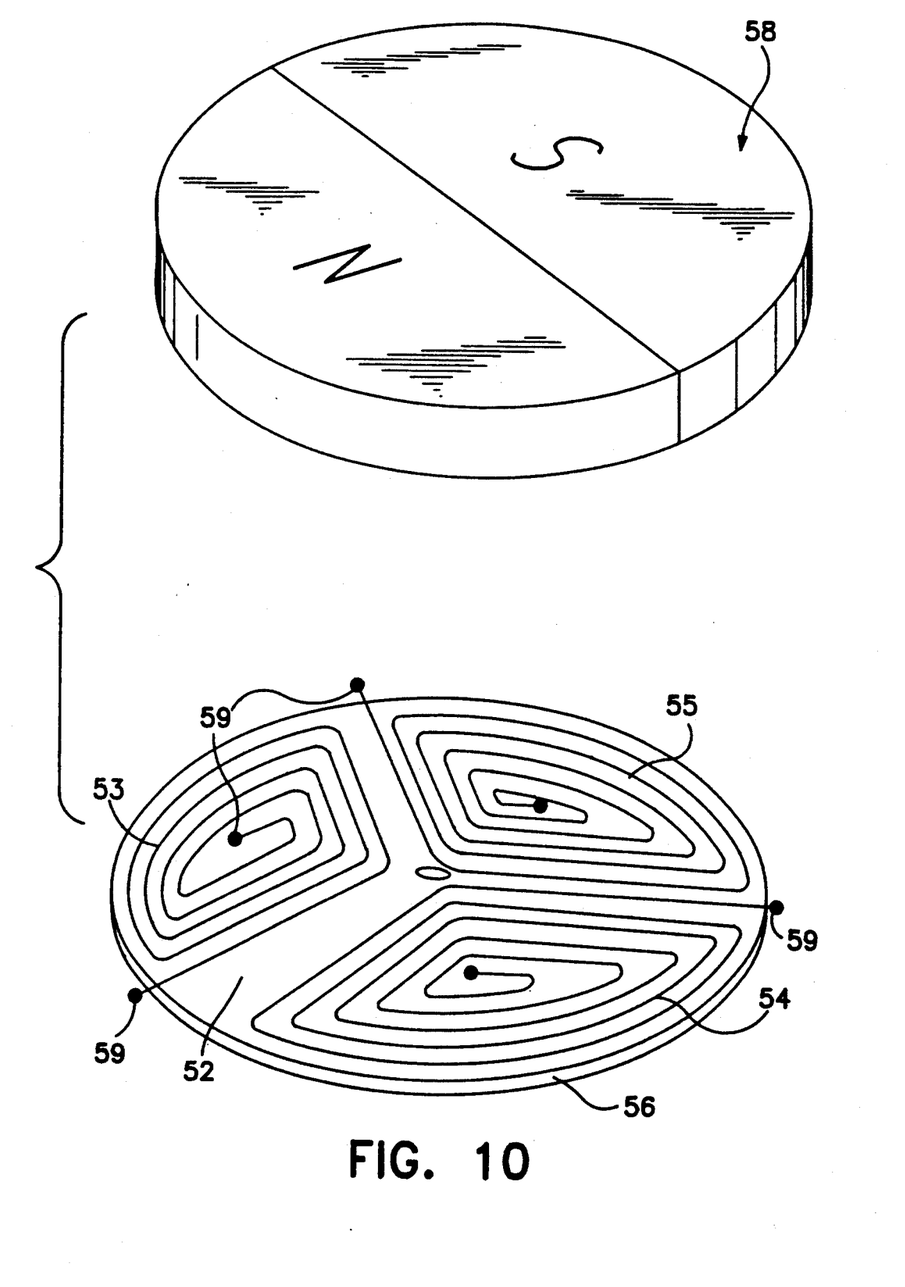
FIG. 10 shows a perspective view of a fifth embodiment of a position sensor.

It can be said in summary for all the embodiments discussed so far that a range of variants is possible for the individual windings of the measuring coil arrangement. FIG. 10 shows a further embodiment for a position sensor for detecting rotary movements. Arranged in the form of sectors on a substrate 52 are three coils 53, 54 and 55, which can be connected via corresponding terminals 59. Applied to the side of the substrate 52 opposite the windings 53, 54, 55 is a core 56 in the form of a circular foil. Provided above the windings 53, 54, 55 is a control magnet 58 which, of course, is arranged at only a short distance from the windings. The control magnet 58 is magnetized radially, so that an approximately linear saturation of the core 56 below the substrate 52 is caused, depending upon the rotary position of the control magnet 58. The angular position of this saturation line rotates about the midpoint together with the control magnet 58.

The function of the windings 53, 54, 55 is not fixed in the present case. One of the windings can serve respectively as the primary winding, while the other two windings represent the secondary windings; however, it is also possible to use two windings as primary windings, and to connect the third winding as a secondary winding to a corresponding evaluation device (not shown). Furthermore, it is possible to connect the three individual windings 53, 54 and 55 as inductors in each case to a corresponding evaluation device, the values of which are controlled by the position of the control magnet 58. Finally, instead of the two-pole control magnet 58 it is also possible to use a control magnet having more than two poles.

Figure 11:
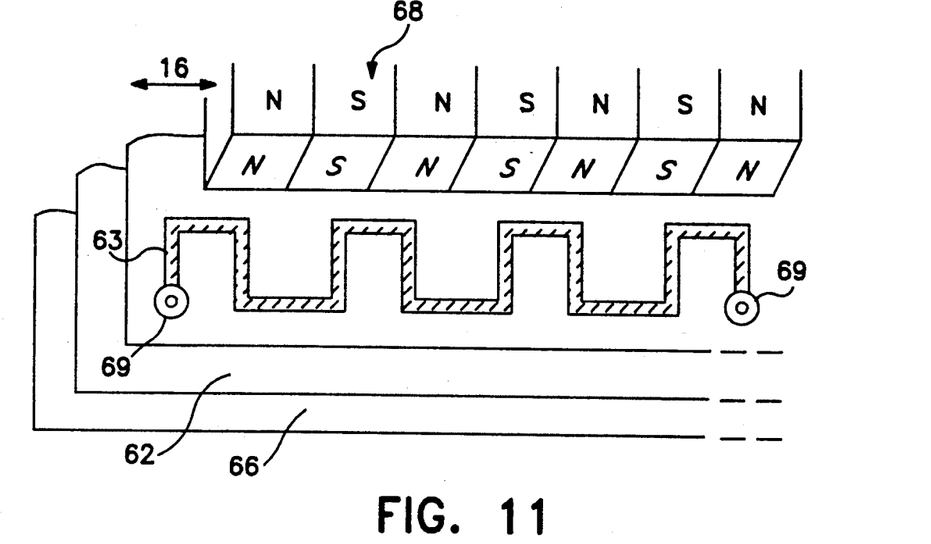
FIG. 11 shows a diagrammatic representation of a position sensor having a meandering measuring coil arrangement.

FIG. 11 shows that instead of the helical windings of the preceding exemplary embodiments, one or more meandering coils 63, which are arranged on a substrate 62, are also possible. The core 66 is arranged, in turn, in the form of a foil below the substrate 62. The coil 63 is connected via contacts 69 to a suitable evaluation device.

A control magnet 68 arranged above the coil 63 or the core 66 is constructed in the present example in a multipole fashion, and moves together with the part 1 to be measured along the double arrow 16. The control magnet 68 is constructed in a multipole fashion; however, a unipolar or double-polar embodiment is also possible.

Figure 12:
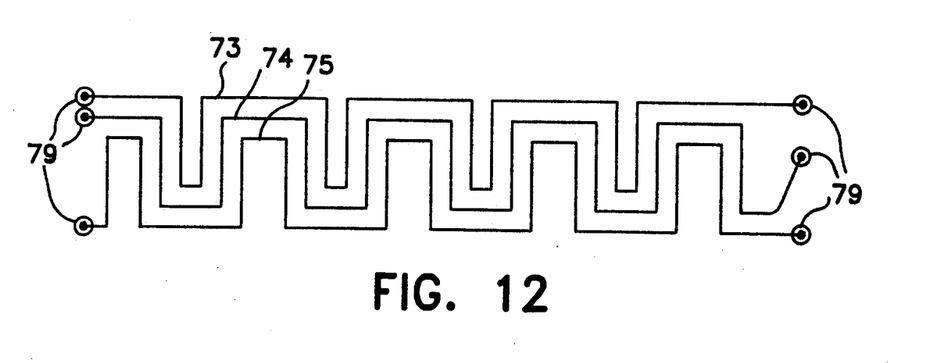
FIG. 12 shows the arrangement of a plurality of meandering windings in a measuring coil arrangement.

FIG. 12 shows a variant of the embodiment according to FIG. 11, in which three meandering coils 73, 74 and 75 of a measuring coil arrangement are provided. The coils 73, 74, 75 are nested in a meandering fashion and connected to corresponding terminals 79. The construction of the windings or coils as meandering coils has the advantage that the resolution of the position sensor can be further improved and the expensive winding of coils is eliminated. The meandering coils 63, 73, 74 and 75 can be applied using printed-circuit technology; it is also possible, however, to apply the known screen-printing technology. The material of the core 66 is a foil which preferably has a high magnetic permeability with a medium to low saturation behavior, for example nickel iron or amorphous metals, which are also designated as metallic glasses and are known, for example, by the tradenames Vitrovac and Metglas.

A range of forms is possible for the evaluation device. In the pulse evaluation, it is expedient to use circuits with a microprocessor to provide current and to evaluate the current characteristics, in order to determine the position of the control magnet precisely.

We claim:

1. A position sensor for detecting movements of a part, comprising: an elongate measuring coil having a longitudinal direction, a soft magnetic core arranged stationary with respect to the elongate measuring coil in the longitudinal direction and having a longitudinal extent and a cross-section that is small in relation to the longitudinal extent, a control magnet movable by the part in the longitudinal direction along the soft magnetic core to partially saturate the latter magnetically as a function of position, the soft magnetic core having a trough-shaped cross-section through which the control magnet is movable by the part.

2. The position sensor according to claim 1, wherein the elongate measuring coil is wound on a tubular carrier member.

3. The position sensor according to claim 1 or claim 2, wherein the length of the core is approximately equal to the length of the travel of the control magnet.

4. The position sensor according to claim 1, wherein the soft magnetic core consists essentially of soft iron sheet material.

5. The position sensor according to claim 1, wherein the control magnet is attracted by the soft magnetic core, resiliently contacts the soft magnetic core, and is guided thereby for motion in the longitudinal direction with the part.

6. The position sensor according to claim 5, wherein the control magnet and/or the core is coated with an abrasion-resistant and friction-reducing layer wherever the one contacts the other.

7. The position sensor according to claim 1, wherein two control magnets of opposite polarity are on opposite sides of the soft magnetic core and coupled together.

8. The position sensor according to any of claims 1, and 2, wherein the measuring coil and the soft magnetic core permit the control magnet to move linearly.

9. The position sensor according to claim 1, wherein the measuring coil is arranged to have the longitudinal direction to be an arcuate longitudinal direction, and the control magnet is constrained to sweep substantially the entire extent of the arcuate longitudinal direction.

10. The position sensor according to claim 1, wherein the measuring coil comprises a transformer having a plurality of windings.

11. The position sensor according to claim 10, wherein the transformer comprises a differential transformer.

12. The position sensor according to claim 11, wherein the transformer comprises two part windings separated from one another in the longitudinal direction and a second winding extending over substantially the entire range of movement of the control magnet.

13. The position sensor according to claim 1, comprising an evaluation device interconnected with the elongate measuring coil for evaluating the electrical values of the measuring coil as a function of position; and wherein the evaluation device is arranged to yield a signal indicating inductance-dependent current characteristics of the measuring coil.

14. The position sensor according to claim 13, further including means for feeding pulsed currents to the measuring coil.

15. The position sensor according to claim 10, comprising an evaluation device including a circuit interconnected with the plurality of windings to evaluate the transfer of signals from a primary winding to a secondary winding of the plurality of windings as a function of the position of the control magnet.

16. The position sensor according to claim 1, wherein the control magnet is a permanent magnet.

17. The position sensor according to claim 1, claim 2 or claim 4, wherein the cross-section of the soft magnetic core is V-shaped.

18. The position sensor according to claim 1, claim 2 or claim 4, wherein the cross-section of the soft magnetic core is U-shaped.

19. The position sensor according to claim 12, wherein the two part windings are nested with respect to the second winding at respective ends thereof.

* * * * *